(12) United States Patent
Yadav et al.

(10) Patent No.: US 12,344,729 B2
(45) Date of Patent: Jul. 1, 2025

(54) LIGHTWEIGHT REINFORCED COMPOSITE FORMULATION AND METHOD OF MAKING THE SAME

(71) Applicant: Vibrantz Technologies Inc., Houston, TX (US)

(72) Inventors: Santosh K. Yadav, Geneva, OH (US); Paul A. Rettinger, Ashtabula, OH (US); Cheryl L. Ludwig, Ashtabula, OH (US)

(73) Assignee: Vibrantz Technologies Inc., Houston, TX (US)

( * ) Notice: Subject to any disclaimer, the term of this patent is extended or adjusted under 35 U.S.C. 154(b) by 152 days.

(21) Appl. No.: 18/189,706

(22) Filed: Mar. 24, 2023

(65) Prior Publication Data

US 2023/0250260 A1    Aug. 10, 2023

Related U.S. Application Data

(62) Division of application No. 17/015,621, filed on Sep. 9, 2020, now Pat. No. 11,643,524.

(51) Int. Cl.
| | |
|---|---|
| *C08K 7/28* | (2006.01) |
| *C08J 3/21* | (2006.01) |
| *C08K 3/40* | (2006.01) |
| *C08L 67/06* | (2006.01) |

(52) U.S. Cl.
CPC ............... *C08K 7/28* (2013.01); *C08J 3/212* (2013.01); *C08K 3/40* (2013.01); *C08L 67/06* (2013.01); *C08L 2312/08* (2013.01)

(58) Field of Classification Search
CPC ..... C08K 7/28; C08K 3/40; C08K 9/06; C08J 3/212; C08J 2367/06; C08J 5/08; C08J 5/005; C08L 67/06; C08L 2312/08
USPC ...................................................... 524/492
See application file for complete search history.

(56) References Cited

U.S. PATENT DOCUMENTS

| | | | |
|---|---|---|---|
| 11,643,524 B2 * | 5/2023 | Yadav ................ | C08K 7/28 524/492 |
| 2002/0139082 A1 | 10/2002 | DeFord | |
| 2003/0199625 A1 | 10/2003 | Twardowska et al. | |
| 2006/0147681 A1 | 7/2006 | Dubey | |
| 2007/0155858 A1 | 7/2007 | Israelson | |
| 2007/0203262 A1 | 8/2007 | Crossley | |
| 2009/0274915 A1 | 11/2009 | Kirkpatrick | |
| 2010/0117265 A1 | 5/2010 | Gleich | |
| 2014/0088244 A1 | 3/2014 | Takeishi et al. | |
| 2017/0114211 A1 | 4/2017 | Kumar et al. | |

FOREIGN PATENT DOCUMENTS

| | | |
|---|---|---|
| CN | 103502357 A | 2/2016 |
| WO | 01/14273 A1 | 3/2001 |

OTHER PUBLICATIONS

Translation of first two pages of Office Action issued in Chinese patent application No. 202080077873.6, issued Aug. 3, 2023.
Translation of Office Action issued in Chinese Patent Application No. 202080077873.6, issued Apr. 27, 2024.
Non-final Office Action issued in U.S. Appl. No. 17/015,621, dated Aug. 30, 2022.
International Search Report and Written Opinion issued in PCT application No. PCT/US2020/049878, mailing date Nov. 19, 2020.
International Preliminary Report on Patentability issued in PCT application No. PCT/US2020/049878, issuance date Mar. 9, 2022.
Examination Report issued in European Patent Application No. 20775552.1, dated Nov. 18, 2024.

\* cited by examiner

*Primary Examiner* — Hannah J Pak
(74) *Attorney, Agent, or Firm* — Benesch Friedlander Coplan & Aronoff LLP

(57) ABSTRACT

A composite formulation for use in lightweight molded components includes an untreated low density filler, such as glass bubbles, a solvated polymer mixture, and polymer paste. In one embodiment the solvated polymer mixture is used to treat the low density filler to form a treated low density filler. The solvated polymer mixture many include a thermoplastic resin or a reactive resin and an additive package. The additive package may include a dispersing agent and a silane carrier composition.

4 Claims, 4 Drawing Sheets

LIGHTWEIGHT REINFORCED COMPOSITE FORMULATION AND METHOD OF MAKING THE SAME

RELATED APPLICATIONS

This application is a divisional of U.S. application Ser. No. 17/015,621, filed Sep. 9, 2020 which claims priority from U.S. Provisional Patent Application No. 62/897,645, filed on Sep. 9, 2019, which is incorporated by reference herein in its entirety.

FIELD

This disclosure is directed to a lightweight composite formulation for use in applications requiring light, strong durable parts, including but not limited to construction, transportation, and similar applications, and a method of making the same.

BACKGROUND

In recent years, numerous ways of reducing the weight of a composite have been identified. Some of the methods presented have focused on fiber selection. Still others have demonstrated the benefits and limitations of light weight engineered fillers with a specific gravity less than water. However, producing a light-weight composite with homogenous color characteristics is a completely different challenge and one that has not yet been met. Most important to consider, there are implications for changing density and glass fiber content that affect not only color, but also rheology and processing characteristics, and ultimately the mechanical properties that are obtained. As this implies, three specific variables are presented: color, density, and mechanical properties. It would be helpful to identify a novel method to achieve a desired combination of homogenous color, density, and mechanical properties.

SUMMARY

An additive package for use in lightweight molded components is provided. The additive package may include about 40% to about 96% by weight of a dispersing agent and about 4% to about 60% by weight of a silane carrier composition. In another embodiment, the dispersing agent is present in an amount of about 68% to about 96% and the silane carrier composition is present in an amount from about 4% to about 32%. In yet another embodiment, the dispersing agent is present in an amount of about 85% and the silane carrier composition is present in an amount of about 15%. In one embodiment, the dispersing agent is comprised of an alkyl amine-based polymer and/or a fluorocarbon.

A solvated polymer mixture for use in lightweight molded components is provided. In one embodiment, the solvated polymer mixture includes about 20% to about 97% by weight of the additive package and about 3% to about 80% of a thermoplastic resin or a reactive resin. In another embodiment, the solvated polymer mixture includes about 60% by weight of the additive package and about 40% by weight of the thermoplastic resin or the reactive resin. In one embodiment, the solvated polymer mixture may be either a thermoplastic resin, or a reactive resin.

A treated low density filler for use in lightweight molded components is provided. In one embodiment the low density filler includes from about 0.5 to about 20% by weight of the solvated polymer mixture and about 80% to about 99.5% of an untreated low density filler. In one embodiment, the untreated low density filler is glass bubbles.

A composite formulation for use in lightweight molded components is provided. In one embodiment, the composite includes the untreated low density filler, the solvated polymer mixture, and a pigmented polymer paste. In another embodiment, the solvated polymer mixture is present in an amount of about 0.5% to about 20% by the weight based on the weight of the untreated low density filler.

In another embodiment, a method of making a treated low density filler for use in lightweight molded components includes the steps of combining about 68% to about 96% of the dispersing agent and about 4% to about 32% of the silane carrier, combining about 20% to about 97% by weight of the additive package with about 3% to about 80% by weight of a thermoplastic resin or a reactive resin to form a diluted mixture, applying heat to the diluted mixture to form a solvated polymer mixture, combining about 0.5% to about 20% by weight of the solvated polymer mixture with about 80% to about 99.5% by weight of an untreated low density filler to form the treated low density filler.

In another embodiment, a method of making a composite for use in lightweight molded parts includes the steps of preparing an additive package, wherein the additive package includes 68% to about 96% of the dispersing agent and about 4% to about 32% of the silane carrier; combining about 20% to about 97% by weight of the additive package with about 3% to about 80% by weight of a thermoplastic resin or a reactive resin to form a diluted mixture; heating the diluted mixture to form a solvated polymer mixture; combining about 0.5% to about 20% by weight of the solvated polymer mixture with about 80% to about 99.5% by weight of an untreated low density filler to form a treated low density filler; preparing a polymer paste; and combining the polymer paste with the low density filler.

BRIEF DESCRIPTION OF THE DRAWINGS

The accompanying figures, which are incorporated in and constitute a part of the specification, illustrate various example configurations and data, and are used merely to illustrate various example embodiments. In the figures, like elements bear like reference numerals.

DETAILED DESCRIPTION

Figure 1:
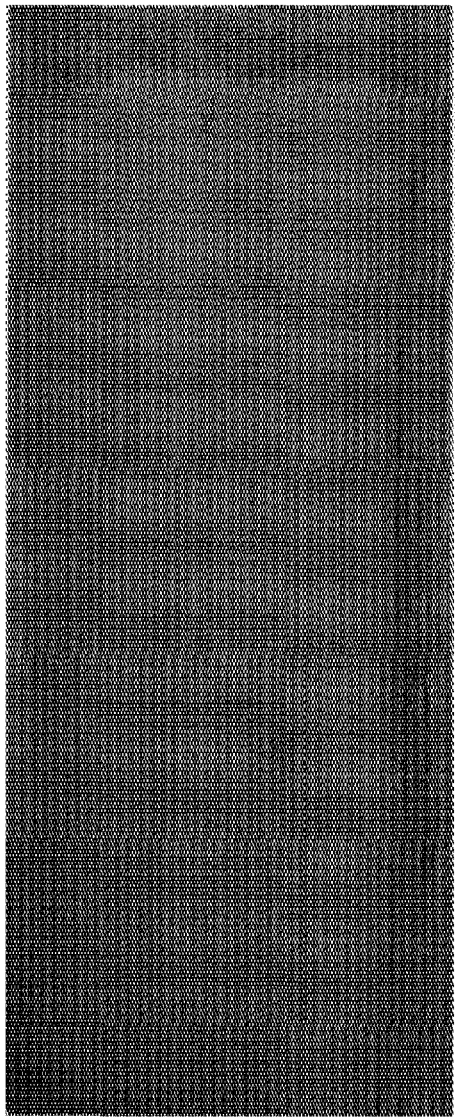
FIG. 1 is a photograph of a black molded component including a low density filler prepared by conventional methods.
Figure 2:
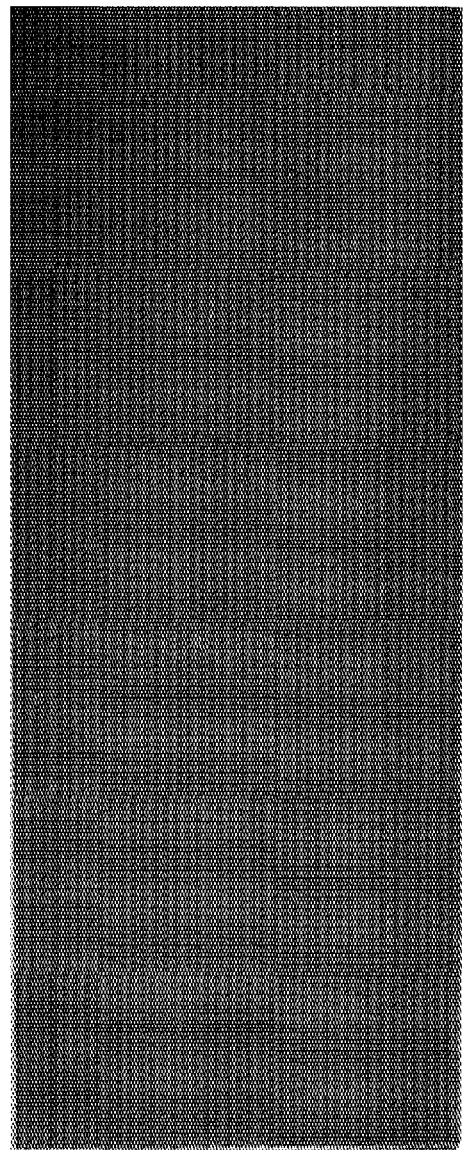
FIG. 2 is a photograph of a black molded component including a low density filler prepared as described in the description below.

It is advantageous to combine a low density filler, such as glass bubbles or other suitable low density filler, such as a hollow sphere or a polymeric ball, with polymer pastes to create molded parts for use in the automotive industry. For the purposes of this discussion, "low density filler" means any filler material that has a density of less than 1.0. This enables the manufacturer to reduce the weight of the part, while maintaining required mechanical characteristics and durability. However, it has been found that simply combining hollow spheres with a pigmented polymer paste results in a molded component having uneven color distribution. For example, as shown in FIG. 1, white swirls of glass beads can be seen on the surface of a black molded component that has been prepared by conventional methods. This non-homogeneous color distribution is unacceptable for use in, for example, composite truck beds for consumer vehicles. Surprisingly, it has been found, that treating the low density filler with a solvated polymer mixture, either before it is combined with the polymer paste or as the polymer paste is combined with the resin, enables the manufacturer to produce a molded polymeric component with even pigment distribution throughout. It should be noted that this description will refer to glass bubbles, by way of example, but it should be understood that any suitable low density filler may be used.

In one embodiment, a lightweight reinforced pigmented composite for use in making molded polymer components is provided. The composite may include a pigmented polymer paste and a treated low density filler. The treated low density filler is generally prepared by combining an untreated low density filler with a solvated polymer mixture. Although the following description will refer to the use of a treated low density filler for use in reinforcing the polymer paste, it should be appreciated that an untreated low density filler and a solvated polymer mixture may be combined with the polymer paste in separate steps to form the reinforced polymer composite.

A composite for use in lightweight molded components may include a pigmented polymer paste and an untreated low density filler treated with a solvated polymer mixture (i.e. the treated low density filler). In one embodiment, the pigmented polymer paste may include polymers used in sheet molding, bulk molding, pultrusion, and casting. In one embodiment, the polymer may include an unsaturated polyester. In another embodiment, the polymer paste may also include a thickener.

In order to form the treated low density filler, hollow spheres are combined with a solvated polymer mixture. The solvated polymer mixture may include a thermoplastic resin and/or a reactive resin. It may further include an additive package made by combining a dispersing agent with a silane carrier composition.

In one embodiment, the additive package includes about about 40% to about 96% by weight of a dispersing agent and about 4% to about 60% by weight of a silane carrier composition. In another embodiment, the dispersing agent is present in an amount of about 68% to about 96% and the silane carrier composition is present in an amount from about 4% to about 32%. In yet another embodiment, the dispersing agent is present in an amount of about 85% and the silane carrier composition is present in an amount of about 15%. The dispersing agent may be selected from any suitable dispersing or wetting agent. Desirably, the dispersing agent will have an affinity for both the low density filler and the pigmentation, and also be highly compatible with various components of the polymer paste. In one embodiment, examples of suitable dispersing agents include, but are not limited to polyimine, polyamine, amine, and fluorocarbon-based polymers.

Examples of such dispersing agents include Solsperse 24000, Solsperse 28000, Solsperse 17000, Solsperse 13940, Solsperse 3000, Solsperse 39000, Solsperse 16000 (commercially available from Lubrizol), Byk-9076 (commercially available from Byk Additives and Instruments), ADD-4276 (commercially available from ADD), Cliqsperse PH (commercially available from Cliq), Soya Lecithin (available from multiples sources), FC 170, FC 4430 (Commercially available from 3M), Afcona 7476, Afcona 7480 (commercially available from Afcona), Terwet 3780 tallow amine ethoxylate (commercially available from Huntsman), and tallow amine oleates (available from multiple sources).

It should be appreciated that the selection of the dispersing agent will be determined by the pigmentation, or resin, to be used, the nature of the filler, and the polymers and monomers present in the polymer paste. It should also be appreciated that the ratio of dispersing agent to silane carrier composition may vary depending on the dispersing agent selected and the desired rheology of the additive package.

The silane carrier compositions may include, but are not limited to vinyl trimethyoxy silane (AP-Silane 21, available from Advanced Polymer, Inc.), y-methacryloxypropyl trimethoxy silane (AP-Silane 71T, available from Advanced Polymer, Inc.), amino-modified propyl trimethoxy silane (Silquest A-1130, available from Momentive), methacryloxypropyl triethoxy silane (available from multiple sources), and gamma-aminopropyltriethoxy silane (Silquest A-1100, available from Momentive).

The additive package may be combined with one or more resins, including thermoplastic resins and reactive resins. One suitable resin includes Elvacite 2013. In one embodiment, about 20% to about 97% of the additive package may be combined with about 3% to about 80% by weight of the resin to form a diluted mixture. In another embodiment, about 60% of the additive package is combined with about 40% of the resin. And in yet another embodiment, about 5% of the resin is combined with about 95% by weight of the additive package. The diluted mixture was then heated and stirred to form the solvated polymer mixture.

EXAMPLES

Example 1

In one example, a 100 g sample of an additive package was prepared by combining about 85% by weight BYK-9076 dispersing agent with about 15% by weight AP-Silane 21 in a DAC orbital mixing cup and processed for about 30 seconds. 95 g of the resulting additive package was then combined with 5 g of Elvacite 2013 to form a 5% diluted mixture. The diluted mixture was then heated at about 60° C. for approximately 24 hours. The sample was then scraped and mixed with a high shear mix blade and allowed to rest at room temperature for about 12 hours to form a solvated polymer mixture.

About 1.32 grams of the 5% solvated polymer mixture (approximately 0.88% by weight) (EXP 1) was then combined with about 148.68 g IM16K glass bubbles (approximately 99.12% by weight), commercially available from 3M, in a one-quart can. The can was then sealed and placed on a horizontal roller for about 3 days in order to coat the bubbles with the solvated polymer mixture. Additional samples of the treated glass bubbles were prepared using 1.76% (EXP 2) and 3.52% (EXP 3) by weight of the solvated polymer mixture.

About 15 g of each of the three samples of treated glass bubbles was then combined with about 30 g of Arotran 805 polymer paste, commercially available from Ashland Chemical.

The rheological data for each resulting reinforced composite sample (Examples 1, 2, and 3), along with a control sample of polymer paste and untreated glass bubbles, was obtained using a TA Instruments Discovery HR 1 Rheometer. The Rheometer was equipped with a 50 mm cone and plate geometry, with a 56 micron gap at the needle of the cone. A controlled frequency sweep was conducted at constant temperature of 25° C., from 0.1 to 100 radians per second, at 5% maximum strain. Prior to data collection, a brief, ten (10) second conditioning time was applied to each sample at the start of the experiment.

Data collection was recorded logarithmically over the specified range of frequencies, with ten datapoints collected per decade, for a total of thirty-one (31) datapoints per sample. The instrument was set to collect sixty-four (64) data measurements per wave form. Equilibration and integration time were each set to five (5) seconds per datapoint over the range of the measurement.

Figure 3:
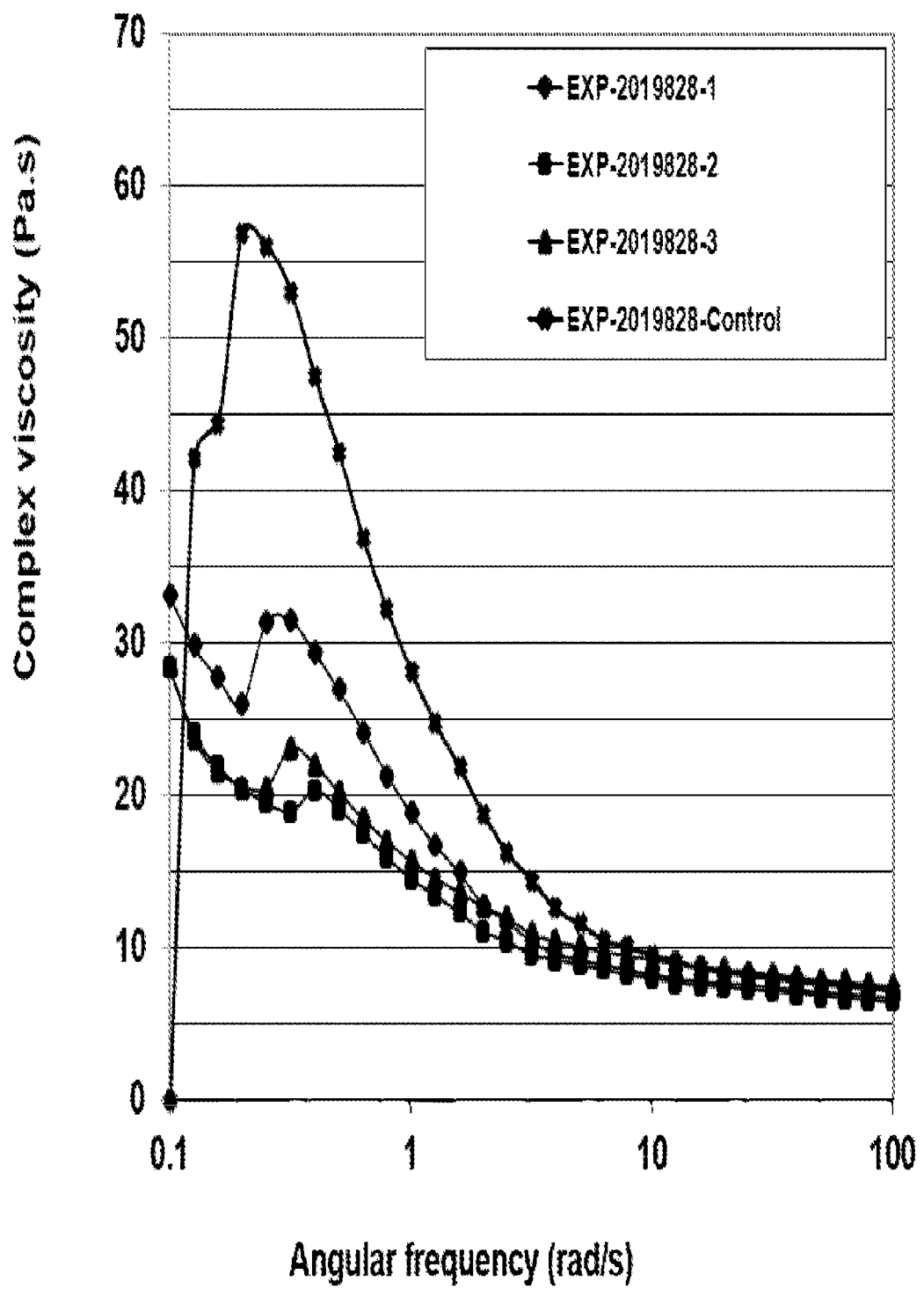
FIG. 3 is a graphical representation of the complex viscosities of various samples of composite formulations.

As shown in FIG. 3, the use of the additive package allows the manufacturer to control or regulate complex fluid behavior, including but not limited to the degree of plasticity, pseudoplasticity, thixotropy, and pseudothixotropy present in the composite formulation. Specifically, the complex viscosity of the composite formulations using the additive package remains lower and more stable over increasing angular frequencies.

Figure 4:
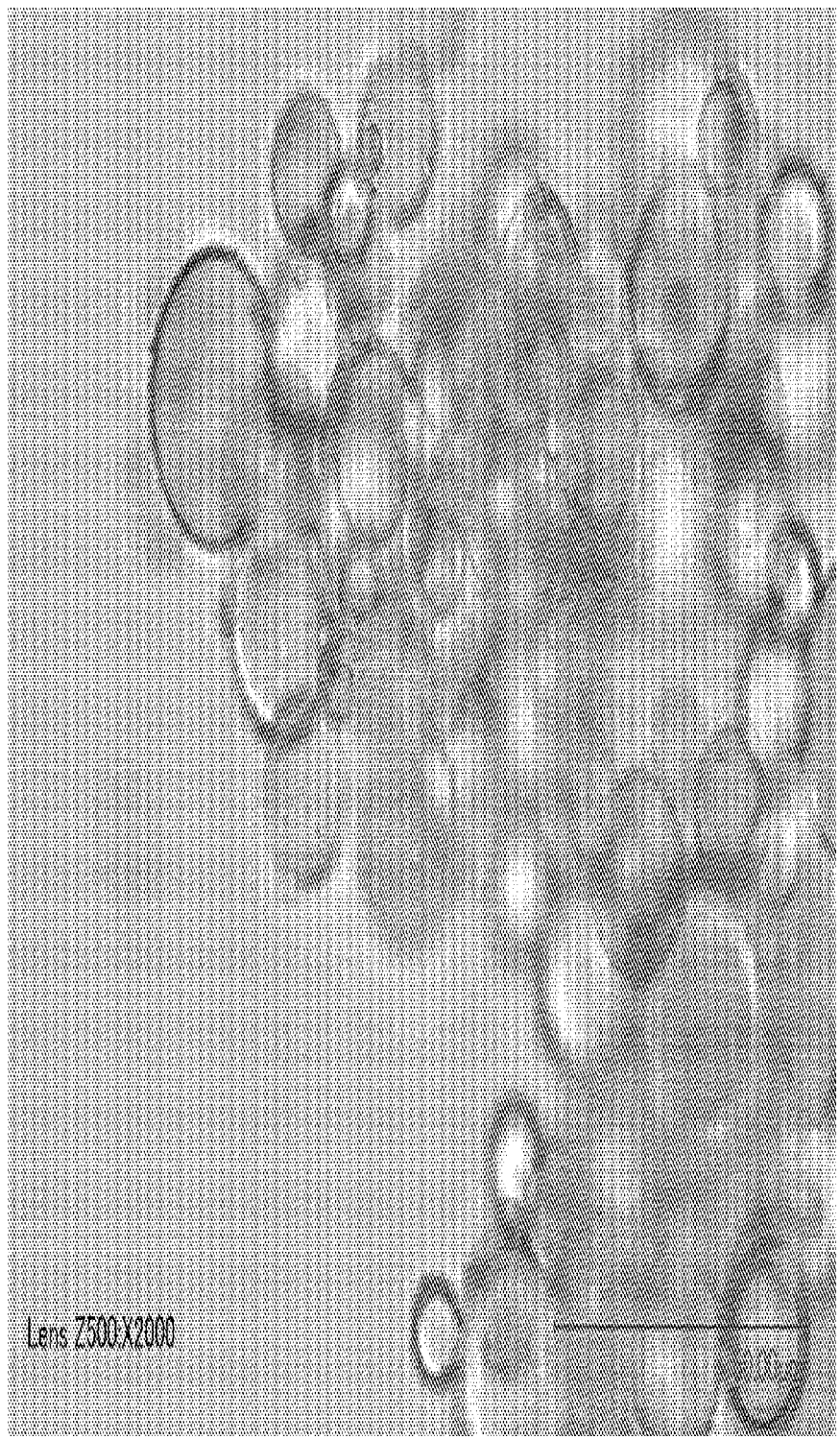
FIG. 4 is 2000× microscopic image of untreated glass bubbles.
Figure 5:
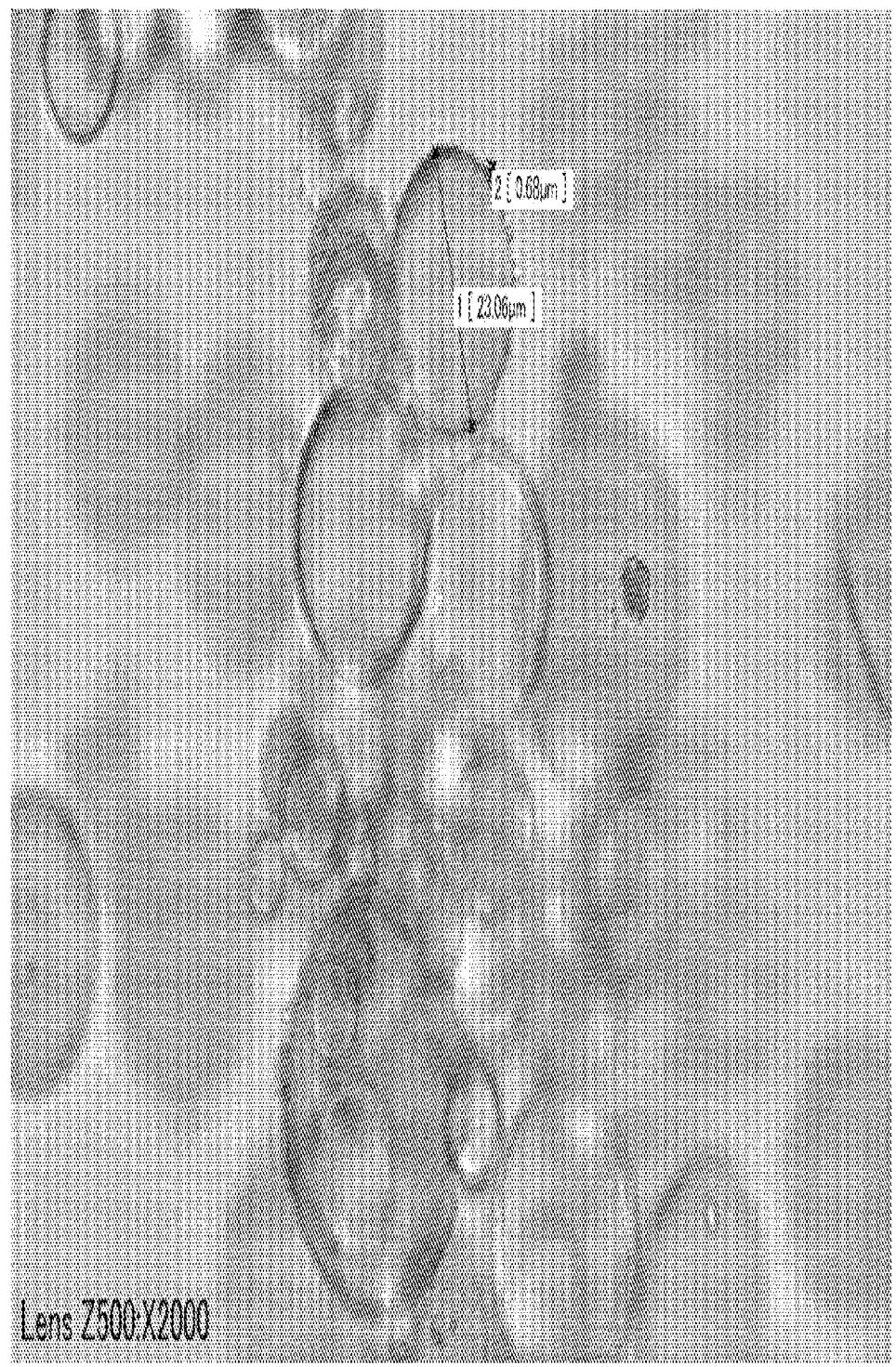
FIG. 5 is a 2000× microscopic image of glass bubbles that have been treated with the solvated polymer mixture.

FIGS. 4 and 5, respectively are microscopic images, taken with a 2000× magnification, of unmodified and surface-treated glass bubbles, respectively. As can be seen from FIG. 5, after the glass bubbles have been treated, multiple sub-micron-scale particulates are found to be adhered to the surface of the bubbles. Without intending to be bound by theory, it is likely that as the silane bonds with the glass, polymethylmethacrylate loses solubility and forms the observed particulates on the surface. Those particulates then serve as a binding sight for color additives to bond with and help wet-out the glass. It is also noted that there are relatively few particulates visible in the image collected of non-treated glass bubbles (FIG. 4). Again, without intending to be bound by theory, it is likely that the few particulates that appear in this image are likely to be sub-micro-level contaminants.

Example 2

In a second example, white, red, and yellow molded component formulations (MCF) were formulated with and without treated glass bubbles. For each formula presented in this section, formulations were reduced to 100.00+/−0.02 g, and the ingredients were weighed and mixed at 2700 RPM for forty-five (45) seconds using an orbital mixer. Temperature was taken before and after the mix process. Viscosity measurements were performed using RVT spindles appropriate for the viscosity of the paste over a period from time to mix until complete maturation viscosity of at least 20 million cP was achieved. Typically, maturation viscosity was achieved in two-three days; however, samples were retained for ongoing viscosity measurement for several weeks. The tables below detail each paste formulation for each color.

White MPF Formulations

Three batches of white MPF were prepared as detailed in Table 1 below:

TABLE 1

| Material Information | | | phr | | |
|---|---|---|---|---|---|
| Description | Sp. Gr. | % NV | Control | A | B |
| Commercial DPG-ISO Unsaturated Polyester Resin | 1.104 | 65.000 | 65.000 | 65.000 | 65.000 |
| Commercial Saturated Low Profile Additive | 1.056 | 61.000 | 35.000 | 35.000 | 35.000 |
| UV Solutions ® UVS-10476 Commercial UV Colorant | 1.979 | 100.000 | 8.000 | 8.000 | 8.000 |
| 1,1-Di(tert-amylperoxycyclohexane), 80% active | 0.850 | 80.000 | 1.500 | 1.500 | 1.500 |
| pBQ solution in DAP, 15% active | 1.161 | 15.000 | 0.400 | 0.400 | 0.400 |
| Commercial Zinc Stearate | 1.095 | 100.000 | 4.500 | 4.500 | 4.500 |
| Aluminum trihydrate (3 micron filler) | 2.420 | 100.000 | 220.000 | | |
| Experimental Filler 20200423d | 0.469 | 100.000 | | | 31.041 |
| Commercial Engineered Filler (20 micron diameter) | 0.460 | 100.000 | | 30.000 | |
| Paste Subtotal Prethickener | | | 334.400 | 144.400 | 145.441 |
| Accumag ® AM-9033 | 1.564 | 100.000 | 6.000 | 6.000 | 6.000 |
| Paste Subtotal with Thickener Hold the Glass: | | | 340.400 | 150.400 | 151.441 |
| Commercial Type-E Fiberglass | 2.6 | 100.000 | 60.099 | 52.262 | 52.563 |
| Total | | | 400.499 | 202.662 | 204.003 |
| Paste % NV | | | 89.119 | 75.372 | 75.542 |
| Paste Specific Gravity | | | 1.728 | 0.878 | 0.879 |
| Paste WPG | | | 14.392 | 7.312 | 7.321 |
| Wt % Fiber | | | 15.006 | 25.788 | 25.766 |
| Vol % Fiber | | | 10.500 | 10.500 | 10.500 |
| SMC Specific Gravity | | | 1.819 | 1.059 | 1.060 |

As can be seen in the above formulations, a commercial DPG-Iso resin as function of typically strong mechanical properties. A commercial saturated low-profile additive is used to provide necessary shrink characteristics. Because the formulation is intended and designed to be weatherable, UVS-10476 is used to provide both color and weatherability. Peroxide initiators and inhibitors are used to provide control of cure characteristics. A commercial grade of zinc stearate is used as mold release. Accumag® AM-9033 is used as a thickener to achieve necessary molding viscosity over time. For purposes of consistency, a commercial grade of glass, one-inch chop, was used at constant volume percentage of 10.5% when molding final parts. The fiber was introduced to the paste at molding viscosity under conditions of elevated temperature and shear.

The difference in the three groups can be found in the filler. Specifically, the control group was made with aluminum trihydrate, while Group A used untreated glass bubbles, and Group B used treated glass bubbles. The treated bubbles (Experimental Filler 20200423d) included 96.648% of glass bubble filler, 2.667% Sartomer SR350 resinous material, 0.582% Byk9076 dispersing agent, and 0.103% Silane AP 21 silane carrier.

Yellow MPF Formulations

Two batches of yellow MPF were prepared as detailed in Table 2 below:

TABLE 2

| Material Information | | | phr | |
|---|---|---|---|---|
| Description | Sp. Gr. | % NV | A | B |
| Commercial DPG-ISO Unsaturated Polyester Resin | 1.104 | 65.000 | 65.000 | 65.000 |
| Commercial Saturated Low Profile Additive | 1.056 | 61.000 | 35.000 | 35.000 |
| UVSolutions ® UVS-80637 Commercial UV Colorant | 2.086 | 100.000 | 8.000 | 8.000 |
| 1,1-Di(tert-amylperoxycyclohexane), 80% active | 0.850 | 80.000 | 1.500 | 1.500 |
| pBQ solution in DAP, 15% active | 1.161 | 15.000 | 0.400 | 0.400 |
| Commercial Zinc Stearate | 1.095 | 100.000 | 4.500 | 4.500 |
| Experimental Filler 20200423d | 0.469 | 100.000 | | 31.041 |
| Commercial Engineered Filler (20 micron diameter) | 0.460 | 100.000 | 30.000 | |
| Paste Subtotal Prethickener | | | 144.400 | 145.441 |
| Accumag ® AM-9033 | 1.564 | 100.000 | 6.000 | 6.000 |
| Paste Subtotal with Thickener Hold the Glass: | | | 150.400 | 151.441 |
| Commercial Type-E Fiberglass | 2.6 | 100.000 | 52.199 | 52.499 |
| Total | | | 202.599 | 203.940 |
| Paste % NV | | | 75.372 | 75.542 |
| Paste Specific Gravity | | | 0.879 | 0.880 |
| Paste WPG | | | 7.321 | 7.329 |
| Wt % Fiber | | | 25.765 | 25.743 |
| Vol % Fiber | | | 10.500 | 10.500 |
| SMC Specific Gravity | | | 1.060 | 1.061 |

The principle difference between the yellow formulations and the white formulations if the change in colorant. Specifically, UVS-80637 was used to achieve a brilliant, weatherable yellow. With regard to the fillers, Group A included untreated glass bubbles, while Group B included the treated glass bubbles described above.

Red MPF Formulations

Two batches of red MPF were prepared as detailed in Table 3 below:

TABLE 3

| Material Information | | | phr | |
|---|---|---|---|---|
| Description | Sp. Gr. | % NV | A | B |
| Commercial DPG-ISO Unsaturated Polyester Resin | 1.104 | 65.000 | 65.000 | 65.000 |
| Commercial Saturated Low Profile Additive | 1.056 | 61.000 | 35.000 | 35.000 |
| UVSolutions ® UVS-70388 Commercial UV Colorant | 1.244 | 100.000 | 8.000 | 8.000 |
| 1,1-Di(tert-amylperoxycyclohexane), 80% active | 0.850 | 80.000 | 1.500 | 1.500 |
| pBQ solution in DAP, 15% active | 1.161 | 15.000 | 0.400 | 0.400 |
| Commercial Zinc Stearate | 1.095 | 100.000 | 4.500 | 4.500 |
| Experimental Filler 20200423d | 0.469 | 100.000 | | 31.041 |
| Commercial Engineered Filler (20 micron diameter) | 0.460 | 100.000 | 30.000 | |
| Paste Subtotal Prethickener | | | 144.400 | 145.441 |
| AM-9033 | 1.564 | 100.000 | 6.000 | 6.000 |
| Paste Subtotal with Thickener Hold the Glass: | | | 150.400 | 151.441 |
| Commercial Type-E Fiberglass | 2.6 | 100.000 | 52.991 | 53.291 |
| Total | | | 203.391 | 204.732 |
| Paste % NV | | | 75.372 | 75.542 |
| Paste Specific Gravity | | | 0.866 | 0.867 |
| Paste WPG | | | 7.212 | 7.221 |
| Wt % Fiber | | | 26.054 | 26.030 |
| Vol % Fiber | | | 10.500 | 10.500 |
| SMC Specific Gravity | | | 1.048 | 1.049 |

The principle difference between the red formulations and the white and yellow is the change in colorant. Specifically, UVS-70388 was used to achieve a brilliant, weatherable red. With regard to the fillers, Group A included untreated glass bubbles, while Group B included the treated glass bubbles described above.

Once the formulations were prepared, sections of twelve-inch square panels were molded. The panels were cut to dimensions of 125×65 mm for purposes of appearance measurement and viscosity testing.

Color measurement was performed using an X-Rite Color-Eye 7000A instrument, under the following conditions:

1. Large area view.
2. 10° Observer.
3. D65 Luminescence.
4. Specular included.
5. CIE (1976) L*a*b* color space.

Tables 3, 4, and 5 below detail the color data for the white, yellow, and red panels, respectively, with L* being the light to dark measurement, a* being the red to green, and b* the yellow color measurement. Table 6 includes the viscosity data for the samples.

TABLE 3

| | White Control | | | | White Formula A | | | | White Formula B | | |
|---|---|---|---|---|---|---|---|---|---|---|---|
| | L* | a* | b* | | L* | a* | b* | | L* | a* | b* |
| Mean: | 95.369 | −0.495 | 3.605 | Mean: | 96.460 | −0.480 | 2.417 | Mean: | 96.697 | −0.460 | 3.370 |
| Stddev: | 0.146 | 0.025 | 0.116 | Stddev: | 0.261 | 0.000 | 0.074 | Stddev: | 0.082 | 0.000 | 0.028 |
| −3S | 94.931 | −0.570 | 3.258 | −3S | 95.677 | −0.480 | 2.196 | −3S | 96.451 | −0.460 | 3.285 |
| +3S | 95.807 | −0.420 | 3.953 | +3S | 97.243 | −0.480 | 2.638 | +3S | 96.942 | −0.460 | 3.455 |

TABLE 4

| | Yellow Formula A | | | | Yellow Formula B | | |
|---|---|---|---|---|---|---|---|
| | L* | a* | b* | | L* | a* | b* |
| Mean: | 92.270 | −9.093 | 71.333 | Mean: | 92.100 | −8.963 | 72.190 |
| Stddev: | 0.083 | 0.017 | 0.191 | Stddev: | 0.067 | 0.075 | 0.008 |
| −3S | 92.021 | −9.144 | 70.759 | −3S | 91.900 | −9.190 | 72.166 |
| +3S | 92.519 | −9.042 | 71.907 | +3S | 92.300 | −8.737 | 72.214 |

TABLE 5

| | Red Formula A | | | | Red Formula B | | |
|---|---|---|---|---|---|---|---|
| | L* | a* | b* | | L* | a* | b* |
| Mean: | 49.360 | 57.360 | 27.733 | Mean: | 51.357 | 54.223 | 25.623 |
| Stddev: | 0.709 | 1.079 | 1.197 | Stddev: | 0.177 | 0.034 | 0.133 |
| −3S | 47.234 | 54.123 | 24.142 | −3S | 50.824 | 54.121 | 25.224 |
| +3S | 51.486 | 60.597 | 31.324 | +3S | 51.889 | 54.325 | 26.022 |

TABLE 6

| | White MPF | | | Yellow MPF | | Red MPF | |
|---|---|---|---|---|---|---|---|
| Hours | Control | A | B | A | B | A | B |
| 0 | 56.0 | 6.1 | 7.4 | 6.4 | 9.0 | 5.8 | 6.1 |
| 0.25 | 2460.0 | 23.7 | 19.2 | 14.4 | 21.8 | 15.0 | 16.0 |
| 1 | 1248.0 | 77.4 | 48.6 | 33.6 | 47.0 | 35.8 | 42.6 |
| 4 | 3840.0 | 206.7 | 157.8 | | 138.2 | 101.1 | 148.5 |
| 24 | 77120.0 | 3600.0 | | 3280.0 | | 1224.0 | |
| 48 | 113760.0 | 7360.0 | 11520.0 | 5440.0 | 13280.0 | 4280.0 | 8480.0 |
| 72 | | | 14560.0 | 6560.0 | 17280.0 | 5480.0 | 11360.0 |
| 120 | | 17760.0 | 17440.0 | 14560.0 | 22240.0 | 12000.0 | 13600.0 |
| 144 | | 20640.0 | | 11280.0 | | 12320.0 | 24480.0 |

Contrary to the intuitive assumptions, light-colored fillers such as aluminum trihydrate can and do affect the color of a white composite—and not necessarily in a positive way. In fact, the data demonstrates that in a highly filled composite system, filler can and will limit the brightness of color that is achievable in a white color space. Additionally, even though the fiber volume is low, the Control white formulation has been shown to have variation in color of about one unit L* (dL* 1.0) across the surface of a white molded part.

Surprisingly, our data indicates that when the untreated glass filler is added to the formulation, replacing aluminum trihydrate, L* increases by about one unit (dL* 1.0), and the variation in L* is increased to about 1.5 units (dL* 1.5).

In the white color space, use of the treated glass filler (White Formula B) is associated with significant improvement in color consistency as compared to the control, and also to Formula A.

In the yellow and red color spaces, the use of the treated filler is associated with increased color and/or chromaticity, and improved color homogeneity. With respect to processing characteristics, we do not see meaningful impact to the initial paste viscosities within the first several hours of thickening. However, after the first 24-48 hours, use of the treated filler appears to be associated with a higher, more robust molding viscosity.

Example 3

In a third example, three batches of MPF formulations were prepared, as described in Table 7 below. Generally, the formulations were reduced to 100.00+/−0.02 g, and the ingredients were weighed and mixed at 2700 RPM for forty-five (45) seconds using an orbital mixer. Temperature was taken before and after the mix process. Viscosity measurements were performed using RVT spindles appropriate for the viscosity of the paste over a period from time to mix until complete maturation viscosity of at least 20 million cP was achieved. Typically, maturation viscosity was achieved in two-three days; however, samples were retained for ongoing viscosity measurement for several weeks.

TABLE 7

| Material Information | | Parts per Hundred (phr) | | |
|---|---|---|---|---|
| Description | Sp. Gr. | Control | A | B |
| Commercial Unsaturated Polyester Resin Matrix | 1.078 | 104.000 | 104.000 | 104.000 |
| 1,1-Di(tert-amylperoxycyclohexane), 80% active | 0.850 | 1.500 | 1.500 | 1.500 |
| pBQ solution in DAP, 10% active | 0.948 | 1.200 | 1.200 | 1.200 |
| Aluminum trihydrate (3 micron filler) | 2.420 | 35.000 | | |
| Experimental Nanodispersion | 1.124 | | | 1.000 |
| *Mix above at 1100 RPM for 15 minutes* | | | | |

TABLE 7-continued

| Material Information | | Parts per Hundred (phr) | | |
|---|---|---|---|---|
| Description | Sp. Gr. | Control | A | B |
| Experimental Filler Additive 1 | 1.101 | | | 0.810 |
| Engineered Glass Filler (avarage diameter 20 microns) | 0.460 | | 15.000 | 15.000 |
| Paste Subtotal, Pre-thickener: | | 141.700 | 121.700 | 123.510 |
| UVSolutions ® UVS-02610 Commercial UV Colorant | 1.203 | 24.000 | 24.000 | |
| UVSolutions ® UVS-02985 Experimental UV Colorant | 1.284 | | | 20.000 |
| Plastigel ® MMEA Experimental Thickener | 1.202 | | | 6.000 |
| Accumag ® AM-9033 | 1.564 | 6.000 | 6.000 | 4.000 |
| Paste Subtotal with Thickener: | | 171.700 | 151.700 | 153.510 |
| Type E Fiberglass (Target Values) | 2.6 | 210.349 | 238.057 | 239.522 |
| Total | | 382.049 | 389.757 | 393.032 |
| Paste % NV | | 74.349 | 70.9672 | 74.6587 |
| Paste Specific Gravity | | 1.246 | 0.973 | 0.979 |
| Paste WPG | | 10.383 | 8.106 | 8.152 |
| Target Wt % Fiber | | 55.058 | 61.078 | 60.942 |
| Target Vol % Fiber | | 37.000 | 37.000 | 37.000 |
| Target SMC Specific Gravity | | 1.747 | 1.575 | 1.579 |

The first MPF formulation shown in this table is a control. The second experiment, "Group A," includes a light weight engineered glass filler that was introduced to the formulation in an attempt to reduce the specific gravity of the compound. For the third experiment, "Group B," an experimental rheological modifier (Experimental Filler Additive 1) was included in an effort to affect the behavior of the engineered glass filler. Experimental Filler Additive 1 includes 85% Byk 9076 and 15% AP Silane 21.

In these examples, MPF paste was mixed about ten (10) minutes using a Cowles mixer, under moderate (1100 RPM) agitation. After mixing, the MPF was compounded on a 24-inch MPF machine, using conventional compounding method. A grass drop was used, targeting 37% fiber by volume, 55% fiber by weight, to make a control formulation with specific gravity 1.75. For experimental formulations, the target fiber volume was maintained at 37%, which as a function of weight and density, increased the weight percent of fiber to about 62%. After compounding, the MPF was rolled into spools, and allowed to mature to a paste viscosity of 24-40 million cP, over a period of seven (7) to ten (10) days. For each compound, approximately ten (10) non-textured 12"×12" panels were molded using a 100-ton hydraulic press, at temperatures of 290-310° F., for three minutes. The average panel thickness was three (3) millimeters.

Appearance and Appearance Measurement

Color measurement was performed using an X-Rite Color-Eye 7000A instrument, under the following conditions:
1. Large area view.
2. 10° Observer.
3. D65 Luminescence.
4. Specular included.
5. CIE (1976) L*a*b* color space.

Gloss measurement was conducted using a BYK-Gardner Micro-Tri-Glossmeter capable of taking simultaneous readings at 20°, 60°, and 85°. For this example, the results focused upon 60° geometry. All color and gloss data presented represents the average of three (3) readings on each panel.

For the weathering evaluation, each data point provided in this example represents the average of three (3) color and three (3) gloss readings per panel. For the starting point data, the average of all readings taken was used as the control for L*, a*, b*, and 60° gloss. A table of our starting point data, including standard deviations, is provided in Table 8.

TABLE 8

| Formula | Calculation | 60° Gloss | L* | a* | b* |
|---|---|---|---|---|---|
| Control | Mean | 73.8 | 26.498 | −0.401 | −2.391 |
| | Std Dev | 9.0 | 0.216 | 0.037 | 0.242 |
| Experimental Formula A | Mean | 72.4 | 27.488 | −0.537 | −2.239 |
| | Std Dev | 7.7 | 0.634 | 0.168 | 0.486 |
| Experimental Formula B | Mean | 69.7 | 26.985 | −0.467 | −2.836 |
| | Std Dev | 2.4 | 0.633 | 0.332 | 1.095 |

Weathering Test Protocol

The resulting panels were subjected to 2000 hours xenon arc exposure by SAE J2527, using an Atlas Ci4000 Weather-O-Meter, with borosilicate inner and outer filters. This exposure is the approximate equivalent of two (2) years exposure in south Florida by SAE J1976, facing five degrees (5°) south. The test cycle is described in Table 9.

TABLE 9

| Cycle | Time (min.) | Function | Irradiance at 340 nm W/(m² · nm) | Black Panel Temperature | Chamber Air Temperature | Relative Humidity |
|---|---|---|---|---|---|---|
| 1 | 60 | dark + spray | — | 38° C. | 38° C. | 0.95 |
| 2 | 40 | light | 0.55 | 70° C. | 47° C. | 0.5 |
| 3 | 20 | light + front spray | 0.55 | 70° C. | 47° C. | 0.5 |
| 4 | 60 | Light + back spray | 0.55 | 70° C. | 47° C. | 0.5 |

Mechanical Testing

Flexural and tensile properties were determined via ASTM D790, using an Instron Model 3366 extensometer. For flexural and tensile properties, five (5) composite specimens of each sample were evaluated. Flexural tests were carried out using a three-point probe, with a maximum load capacity of 50 KN, under a crosshead speed of 0.05 in/min. Test results were generated using Bluehill 2 software.

Notched Izod testing was performed carried out in accordance with ASTM D236, to determine relative impact strength of the various formulations.

Weathering Results

Following weathering exposure, the panels were rinsed under warm water, and dried with a soft cotton cloth. Each panel was then subjected to the average of three readings of color and gloss as described in the experimental section. A table of the exposures and subsequent weathering results may be found in Table 10.

A. There can be change in color, as measured by L*a*b*;

B. There may also be erosion of the surface, resulting in subsequent loss of gloss.

TABLE 10

Exposure and Appearance Data upon Completion of SAE J2527 (boro/boro) Exposure.

Control Formula

| SAE J2527 Exposure | | | CIE 1976 L*a*b* Color Values | | | | | | | Gloss Data | |
|---|---|---|---|---|---|---|---|---|---|---|---|
| kJ UV | Hours | Years Eq | L* | a* | b* | delta L* | delta a* | delta b* | delta E* | 60° Gloss | % Gloss |
| 0 | 0 | 0.0 | 26.498 | −0.401 | −2.391 | 0.00 | 0.00 | 0.00 | 0.00 | 73.8 | 100.0% |
| 675 | 511 | 0.5 | 27.233 | −0.480 | −2.925 | 0.74 | 0.08 | 0.53 | 0.91 | 60.1 | 81.5% |
| 1326 | 1006 | 1.0 | 27.326 | −0.392 | −2.561 | 0.83 | 0.01 | 0.17 | 0.85 | 43.1 | 58.4% |
| 2074 | 1572 | 1.5 | 26.593 | −0.394 | −1.974 | 0.10 | 0.01 | 0.42 | 0.43 | 46.3 | 62.8% |
| 2638 | 2001 | 2.0 | 26.290 | −0.265 | −1.871 | 0.21 | 0.14 | 0.52 | 0.58 | 50.6 | 68.6% |

Experimental Formula 1

| SAE J1976 S. Florida | | | CIE 1976 L*a*b* Color Values | | | | | | | Gloss Data | |
|---|---|---|---|---|---|---|---|---|---|---|---|
| kJ UV | Hours | Years Eq | L* | a* | b* | delta L* | delta a* | delta b* | delta E* | 60° Gloss | % Gloss |
| 0 | 0 | 0.0 | 27.488 | −0.537 | −2.239 | 0.00 | 0.00 | 0.00 | 0.00 | 72.4 | 100.0% |
| 675 | 511 | 0.5 | 27.620 | −0.546 | −2.317 | 0.13 | 0.01 | 0.08 | 0.15 | 49.9 | 69.0% |
| 1326 | 1006 | 1.0 | 27.911 | −0.371 | −1.942 | 0.42 | 0.17 | 0.30 | 0.54 | 55.9 | 77.3% |
| 2074 | 1572 | 1.5 | 27.108 | −0.334 | −2.072 | 0.38 | 0.20 | 0.17 | 0.46 | 49.9 | 69.0% |
| 2638 | 2001 | 2.0 | 26.223 | −0.156 | −1.718 | 1.26 | 0.38 | 0.52 | 1.42 | 38.9 | 53.8% |

Experimental Formula 2

| SAE J1976 Arizona | | | CIE 1976 L*a*b* Color Values | | | | | | | Gloss Data | |
|---|---|---|---|---|---|---|---|---|---|---|---|
| kJ UV | Hours | Years Eq | L* | a* | b* | delta L* | delta a* | delta b* | delta E* | 60° Gloss | % Gloss |
| 0 | 0 | 0.0 | 26.985 | −0.467 | −2.836 | 0.00 | 0.00 | 0.00 | 0.00 | 69.7 | 94.5% |
| 675 | 511 | 0.5 | 27.284 | −0.620 | −3.777 | 0.30 | 0.15 | 0.94 | 1.00 | 49.7 | 67.4% |
| 1326 | 1006 | 1.0 | 26.927 | −0.195 | −1.492 | 0.06 | 0.27 | 1.34 | 1.37 | 44.5 | 60.3% |
| 2074 | 1572 | 1.5 | 26.237 | −0.247 | −2.491 | 0.75 | 0.22 | 0.35 | 0.85 | 41.2 | 55.9% |
| 2638 | 2001 | 2.0 | 27.077 | −0.278 | −1.824 | 0.09 | 0.19 | 1.01 | 1.03 | 38.5 | 52.2% |

As noted above, the panels were evaluated for weathering characteristics by SAE J2527, using boro silicate inner and outer filters, for 2000 hours of xenon arc exposure. It is relevant to understand that the Ci4000 is calibrated at 340 nm UV irradiance, to 0.55 Watts per square meter. Under these conditions of approximately 660 kJ of UV exposure (as measured at 340 nm) is achieved in about 500 hours of testing. It was determined that 1320 kJ, or 1000 hours of xenon arc exposure, is roughly equivalent to one (1) year exposure in south Florida at five degrees) (5°) south by SAE 1976.

A typical transportation specification requires that a weatherable material must not undergo meaningful, visible change to the observer after a specified period of exposure in south Florida. Typically, the minimum exposure acceptable is two (2) to five (5) years, depending upon the manufacturer, and the application [3-5]. In dark color space, appearance change is indicated in two (2) ways:

Typically, in a black color space, a change in color of more than 2.0 dE* will begin to be noticeable to an observer. This is especially true for a material that loses more than 50% of its original gloss as measured at 60°.

By these standards of appearance, none of the formulations underwent objectionable appearance change under testing. However, some differences emerged between the formulations. Over the period of exposure, the control formulation retained close to seventy percent (70%) of its original gloss, and remained under 1.0 dE* from the original color. After 2000 hours, however, Experimental Formula A possessed a dE* more than twice that of the control formulation, and retained only about fifty percent (50%) of the gloss. We attribute this to the influence of the untreated glass filler used to reduce the weight or density of the composite. Experimental Formula B also retained about fifty percent (50%) of its gloss, while remaining within about 1.0 dE* of the original color. Therefore, it would appear that use of Experimental Filler Additive 1 as an additive to modify the rheology of the formulation was able to reduce the impact of the treated glass filler upon color retention.

Mechanical Properties

Key properties of the formulations are identified in the following tables 11. 12, and 13:

TABLE 11

Physical characteristics of MPF composites.

| Formula | Specific gravity | Fiber Glass (Wt %) | Fiber Glass (Volume %) | Engineered filler (Wt %) | Engineered filler (Volume %) |
|---|---|---|---|---|---|
| Control | 1.75 | 55 | 37.04 | 0.00 | 0.00 |
| Experimental Formula A | 1.59 | 62 | 37.81 | 3.75 | 12.98 |
| Experimental Formula B | 1.60 | 62 | 38.28 | 3.71 | 12.91 |

TABLE 12

Tensile Properties of MPF Composites.

| | Tensile Strength (MPa) | | Tensile Modulus (MPa) | | Tensile Elongation (%) at Break | |
|---|---|---|---|---|---|---|
| Formula | TS | Std. Dev | TM | Std. Dev | TE | Std. Dev |
| Control | 171.28 | 6 | 13156.60 | 1093.43 | 1.50 | 0.15 |
| Experimental Formula A | 139.59 | 11 | 12170.00 | 2173.46 | 1.31 | 0.20 |
| Experimental Formula B | 144.62 | 23 | 14007.60 | 1752.51 | 1.17 | 0.15 |

TABLE 13

Flexural Properties of MPF Composites.

| | Flexural Strength (MPa) | | Flexural Modulus (MPa) | |
|---|---|---|---|---|
| Formula | FS | Std. Dev | TM | Std. Dev |
| Control | 259.13 | 34.30 | 11654 | 1415 |
| Experimental Formula A | 235.17 | 18.96 | 11016 | 933 |
| Experimental Formula B | 302.12 | 18.00 | 14269 | 487 |

The results in Table 11 and Table 12 show tensile properties and flexural properties of Experimental Formulations 1 and 2, relative to the control. As relates to tensile properties, it appears that the addition of lightweight glass filler to the composite has adverse impact (~17%) on tensile strength. This is supported by an observed reduction in percent elongation at break that is similarly associated with the introduction of light-weight engineered glass filler to the formulation. However, the tensile moduli of all three formulations are within standard deviation of each other.

With respect to flexural characteristics, as slightly different picture emerges. The flexular strength of Experimental Formula A is about a standard deviation lower than the flexural strength of the control. This is consistent with the data produced for tensile characteristics. However, the flexular strength and modulus of Experimental Formula B are several standard deviations higher than those of the control. In order to explain this phenomenon, we performed an analysis of the flexural and tensile characteristics of the formulations, versus the quantity of glass fiber volume used as reinforcement.

TABLE 14

A Comparison of Tensile and Flexular Strength to the Percent Volume of Glass Fiber Reinforcement.

| Formula | Sum of Flexural Strength (FS) and Tensile Strength (TS) | (FS + TS)/ Percent Glass Fiber Volume | Flexural Strength/ Percent Glass Fiber Volume |
|---|---|---|---|
| Control | 430.40 | 11.62 | 7.00 |
| Experimental Formula A | 374.76 | 9.91 | 6.22 |
| Experimental Formula B | 446.74 | 11.67 | 7.89 |

Mechanical properties achieved in these formulations may be dependent upon fiber reinforcement that is used. In order to realize benefits of fiber reinforcement, it may be beneficial for the reinforcing fiber to be uniformly wet out and dispersed within the resin matrix.

In the above table, a fifteen percent (15%) decrease in total quantity of mechanical properties per unit volume of fiber reinforcement was observed, between the control and Experimental Formula A. This suggests that when lightweight filler is added to the formulation in place of more traditional fillers (e.g. aluminum trihydrate), the interface between fiber and polymer matrix is adversely affected. By contrast, when rheological additives and modifiers are introduced to the formulation (as with Experimental Filler Additive 1 in Experimental Formula B), the adverse impact appears to be minimized, or to some degree, reversed. Again, it appears that in an MPF formulation, modifying the rheology and wetting characteristics of the polymer matrix, relative to the reinforcing fiber, will improve or detract from mechanical properties of the compounded and molded formulation.

Therefore, an addition of less than four percent (4%) by weight of untreated glass filler with theoretical specific gravity of 0.46 was sufficient to reduce the density of a sheet molding compound with thirty-seven percent (37%) volume of glass fiber from specific gravity ~1.75 to less than 1.60. However, addition of even this small amount of untreated glass filler had significant effect upon mechanical properties, and also the weatherability of the compound. The impact of the filler (Experimental Formula A) was thought to be to the rheology of the matrix in process, and this adversely affects the interface between the fiber and polymer matrix. This observation is supported by the weathering results, in which intensified gloss and L* degradation was associated with addition of untreated glass ball filler.

Accordingly, in Experimental Formula B, a rheological additive package was introduced, to reverse the impact of the untreated glass filler upon load transfer of the polymer composite matrix. While the addition of the additive did not improve the tensile strength, it did improve the flexural characteristics of the resulting material. In addition, the addition of rheological modifier to the glass bubbles appears to have minimized the impact of the untreated glass filler upon weathering performance.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

The invention claimed is:

1. A method of making a treated low density filler for use in lightweight molded components, the method comprising the steps of:
   combining about 85% by weight of a dispersing agent with about 15% by weight of a silane carrier composition to form an additive package;
   combining about 20% to about 97% by weight of the additive package with about 3% to about 80% by weight of a thermoplastic resin or a reactive resin to form a diluted mixture;
   applying heat to the diluted mixture to form a solvated polymer mixture; and
   combining about 0.5% to about 20% by weight of the solvated polymer mixture with about 80% to about 99.5% by weight of an untreated low density filler to form a treated low density filler.

2. A method of making a composite formulation for use in lightweight molded parts, the method comprising the steps of:
   preparing an additive package, wherein the additive package comprises about 85% by weight of a dispersing agent and about 15% by weight of a silane carrier composition;
   combining about 20% to about 97% by weight of the additive package with about 3% to about 80% by weight of a thermoplastic resin or a reactive resin to form a diluted mixture; and
   heating the diluted mixture to form a solvated polymer mixture.

3. The method of claim 2, wherein the method further comprises the steps of:
   combining about 0.5% to about 20% by weight of the solvated polymer mixture with about 80% to about 99.5% by weight of an untreated low density filler to form a treated low density filler;
   preparing a polymer paste; and
   combining the polymer paste with the treated low density filler.

4. The method of claim 2, wherein the method further comprises the steps of:
   combining the solvated polymer mixture with a polymer paste to form a solvated polymer paste; and
   combining the solvated polymer paste with an untreated low density filler.

* * * * *